US005802887A

United States Patent [19]

Béland

[11] Patent Number: 5,802,887

[45] Date of Patent: Sep. 8, 1998

[54] SNOWMOBILE SKI LOCK

[76] Inventor: Camille Béland, 679, Place Louise-Philippe, Baie-Comeau (Québec), Canada

[21] Appl. No.: 761,372

[22] Filed: Dec. 9, 1996

[30] Foreign Application Priority Data

Apr. 24, 1996 [GB] United Kingdom .................. 9608425

[51] Int. Cl.[6] .......................... E05B 73/00; B60R 25/00

[52] U.S. Cl. .................................. 70/14; 70/19; 70/237; 70/57; 180/190

[58] Field of Search ................................ 180/190, 182; 70/14, 19, 18, 57, 58, 233, 237, 258, 226, 225, 227, 234; 211/5, 8

[56] References Cited

U.S. PATENT DOCUMENTS

| | | | |
|---|---|---|---|
| 1,317,329 | 9/1919 | Shorday | 70/226 |
| 1,354,172 | 9/1920 | Courtney | 70/200 |
| 1,388,322 | 8/1921 | Branco | 70/18 |
| 1,483,687 | 2/1924 | Shepard | 70/18 |
| 3,330,573 | 7/1967 | Sieloff | 70/58 |
| 3,734,241 | 5/1973 | Hale | 188/32 |
| 3,754,420 | 8/1973 | Oellerich | 70/58 |
| 3,810,530 | 5/1974 | Jay | 188/32 |
| 3,881,680 | 5/1975 | Lietaert, Jr. | 211/5 |
| 4,186,823 | 2/1980 | White, Jr. | 188/32 |
| 5,044,845 | 9/1991 | Baker, Jr. | 180/190 |
| 5,203,655 | 4/1993 | Persau | 410/3 |
| 5,222,381 | 6/1993 | Wilcox | 70/19 |
| 5,265,449 | 11/1993 | Rashleigh | 70/18 |
| 5,479,794 | 1/1996 | Rains | 70/226 |
| 5,562,177 | 10/1996 | Chacon | 70/237 |

FOREIGN PATENT DOCUMENTS

| | | | |
|---|---|---|---|
| 961296 | 1/1975 | Canada | 70/58 |
| 2109640 | 5/1995 | Canada . | |
| 2123732 | 11/1995 | Canada . | |
| 2279590 | 2/1976 | France | 70/14 |
| 2443946 | 8/1980 | France | 70/203 |
| 2705241 | 8/1978 | Germany | 70/58 |
| 26901 | 1/1913 | United Kingdom | 70/259 |

*Primary Examiner*—Darnell M. Boucher

[57] ABSTRACT

A snowmobile ski lock used in combination with a ski of a snowmobile with a central track and two spread out skis, to lock the snowmobile to the ground. The lock comprises a reversed U-shaped toothed section kept in place under a ski by means of a member going around the top of the ski. The toothed section has a number of triangular teeth under its U-shaped section, which penetrate into the ground and block one ski of a snowmobile. When a thief tries to set a snowmobile into motion, the locked ski stays attached to the ground, thus causing the snowmobile to pivot around the lock and not go forward.

7 Claims, 3 Drawing Sheets

SNOWMOBILE SKI LOCK

BACKGROUND-FIELD OF INVENTION

This invention belongs to the family of thief-proof locks and more particularly to security devices to lock vehicles having two skis and a central track, as snowmobiles, to prevent their theft.

BACKGROUND-DESCRIPTION OF THE PRIOR ART

A review of the prior art has revealed the following patents:

FR 2,279,590, Thiebault, 20 Feb. 1976, shows a scotch for immobilizing a heavy vehicle: It locks the wheel, preventing the wheel to roll, touching the ground at one point. This device does not offer any grip to the ground, it only prevents wheels of a vehicle to roll. A slippery surface would allow a vehicle and its scotch to be moved.

U.S. Pat. No. 5,265,449, Rashleigh, 30 Nov. 1993, has an anti-theft device 20 locking the track 24 of a snowmobile 22, the device comprising an elongated main arm member 30 and an auxiliary arm member 42, preventing the track 24 to move. This device does not anchor the vehicle onto the ground and the track or skis could still slide.

U.S. Pat. No. 5,222,381, Wilcox, 29 Jun. 1993, illustrates a locking device comprising a lever 14, two oppositely directed hooks 22–24 to lock a vehicle steering wheel. This device does not anchor the vehicle to the ground.

Anti-theft devices, locking either the drive mechanism or the steering wheels, are not reliable means in the case of light vehicles. Light vehicles, as snowmobiles, have most of their weight at the front, applying a great pressure against the ski, to permit an easy lifting of the back of the vehicle and slide it on icy surfaces. So the known anti-theft devices, locking either the drive mechanism or the steering wheels do not provide security means against theft.

OBJECTS AND ADVANTAGES

The main objective of my invention is to provide an anti-theft lock adapted to an apertured ski of a vehicle, and that provides a good gripping of the ski against the ground. The purpose of this is to prevent the vehicle from being easily moved whatever method a thief might use.

Another objective is to provide a locking member to be inserted through the ski aperture and a piece to be placed under the ski and sink into the ground, both locking member and the piece to be locked together by a padlock; the device is to be of small size, such as 7,5 cm×10 cm ×27 cm, to be easily stored and manipulated.

BRIEF DESCRIPTION OF THE DRAWINGS

The present invention will be further understood from the following description with reference to the drawings in which.

DESCRIPTION OF A PREFERRED EMBODIMENT

Figure 1:
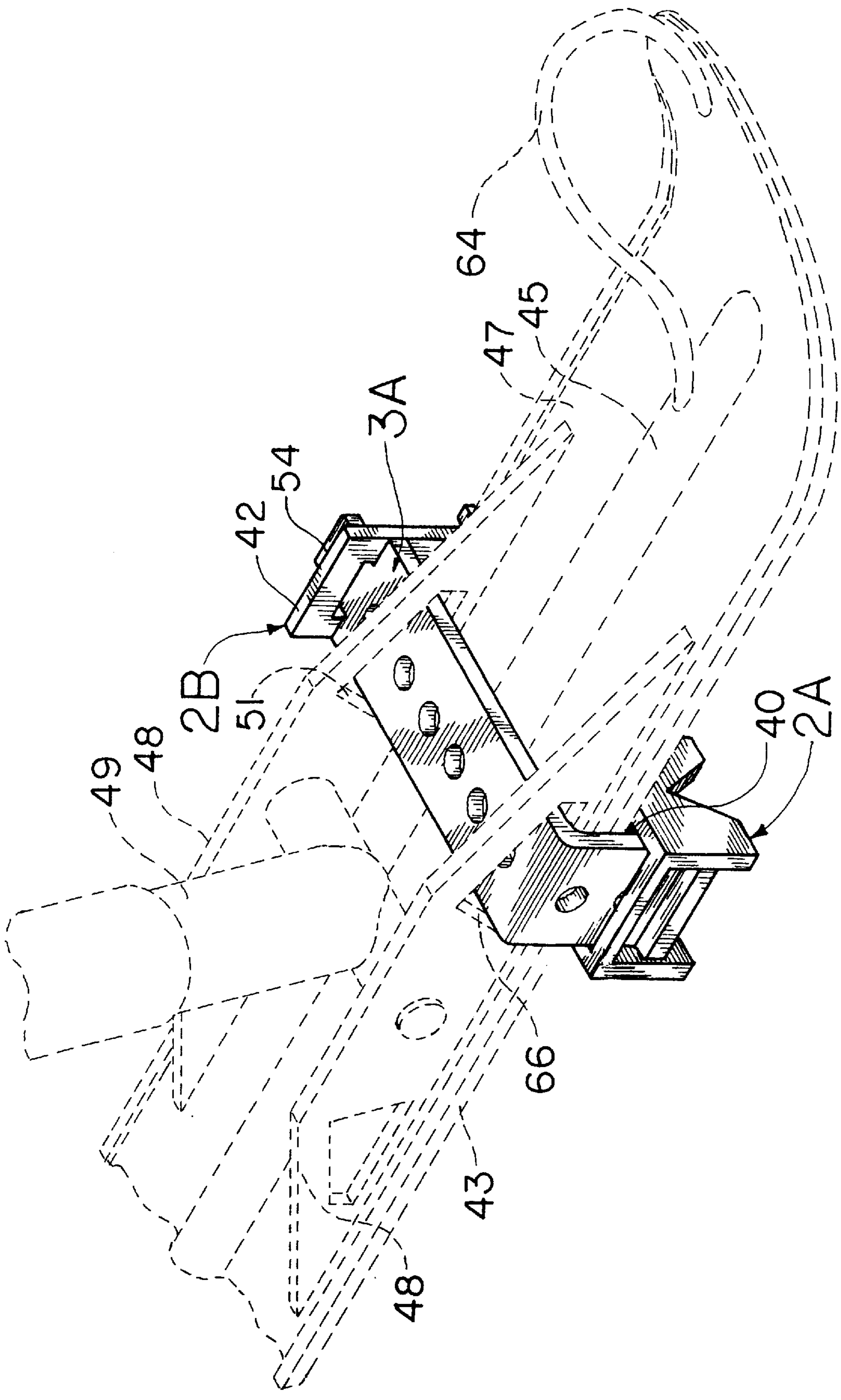
FIG. 1 is a perspective of the device of the invention that can be padlocked and shown installed on an apertured ski of a snowmobile

The preferred embodiment of the invention is illustrated in FIGS. 1 to 3B where the same characterizing elements are identified by the same numbers:

FIG. 1 illustrates, in dotted line, a part of one of the two apertured skis 47 of a snowmobile, each ski 47 comprising a top 45 from which upwardly protudes bracket 48 to receive a support 49 and a bottom 43 facing the ground. The brackets 48 have transversely aligned apertures 51,66. The snowmobile has a central track that is not shown here but that is usually placed between the skis 47. The device of the invention is composed of three parts namely a ground engaging member 2A, a pivotal member 2B and a locking member 3A. Member 2A is elongated and has a reversed U shaped section placed transversally under the ski 47 and held in place by members 2B and 3A. Pivotal member 2B is mounted to a pivoting axis 38—FIG. 2A—and a locking member 3A is inserted in a rectangular aperture 40 of ground engaging member 2A and passes around the top 45 of the ski 47 and through ski openings 51,66 and connecting with pivotal member 2B.

Figure 2A:
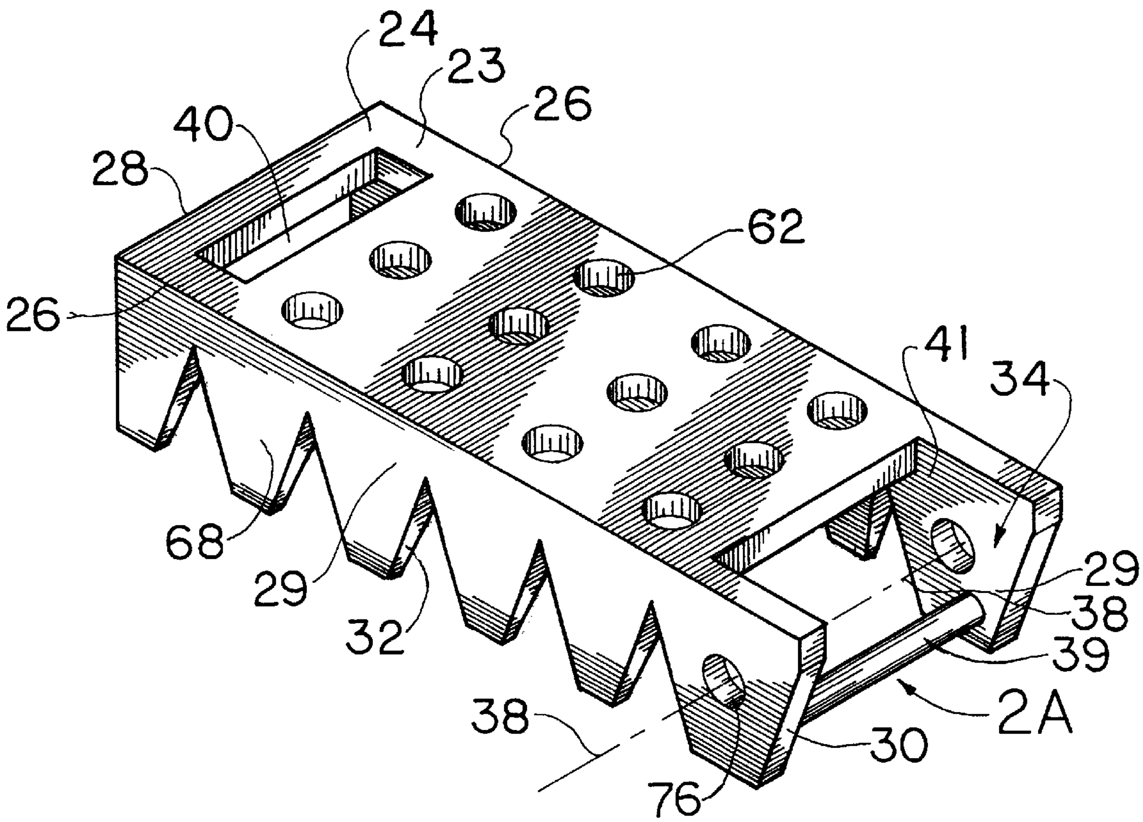
FIG. 2A is a perspective of the ground engaging member

FIG. 2A shows ground engaging member 2A which consists of a rectangular web 24 and two wings 29. Web 24 has a top surface 23, two long sides 26 and two short sides 28. The two wings 29 with web 24 are attached along the long sides 26 and have a serrated free edge, a reversed U-shaped section, the wings used as means for gripping 32 and consisting of a set 68 adapted to sink into the ground. Member 2A has a pivoting end 34 and an attachment end 36 both ends coinciding with the short sides 28. The pivoting end 34 has pivot holes 76 made in wings 29 and disposed on which is formed by the fact that a pivoting axis 38 crossing the wings 29, under and opening 41. Rectangular web 24 is recessed relative to wings 29 at the pivoting end 34. A transverse stop rod 39 joins the wings 29 under the pivoting axis 38 and is there to limit the reclining of pivotal member 2A. The attachment end comprises a rectangular aperture 40 made in web 24 end comprising a longer side 78 parallel to the short sides 28 of the rectangular web 24.

The rectangular web 24 shows twelve spaced holes 62 arranged, for example, in three tow and four columns. The holes 62 are there to lighten the U shaped ground engaging member 2A.

Figure 2B:
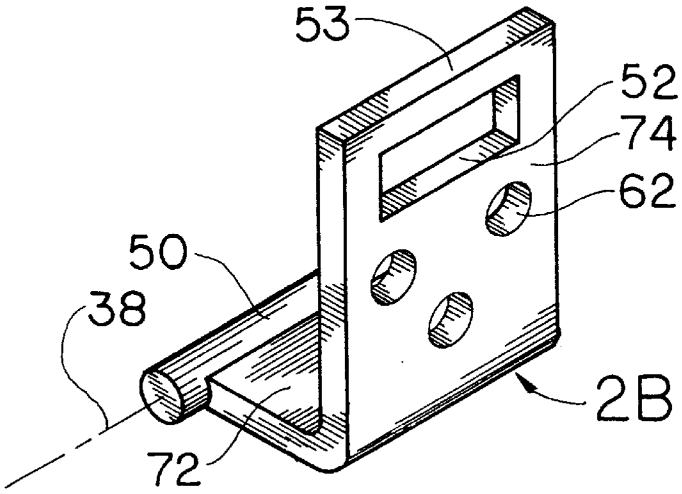
FIG. 2B is a perspective of the pivotal member

FIG. 2B illustrates pivotal member 2B with preferably a L-shaped section comprising a short part 72 joined to a long part 74, the short part 72 to the free end of which is attached to a protruding pin 50 placed along the pivoting axis 38 and engaging pivot holes 76 of wings 29. A locking aperture 52 in the long part 74 receives a protruding end 54—FIG. 3A—of locking member 3A. Long part 74 has weight decreasing holes 62 asymmetrically disposed. The length of short part 72 is such that long part 74 rests flat onto top surface 23 of web 24 when pivotal member 2B is pivoted to an inoperative, stored position, when protruding end 54 of locking member 3A is removed from locking aperture 52.

Figure 3A:
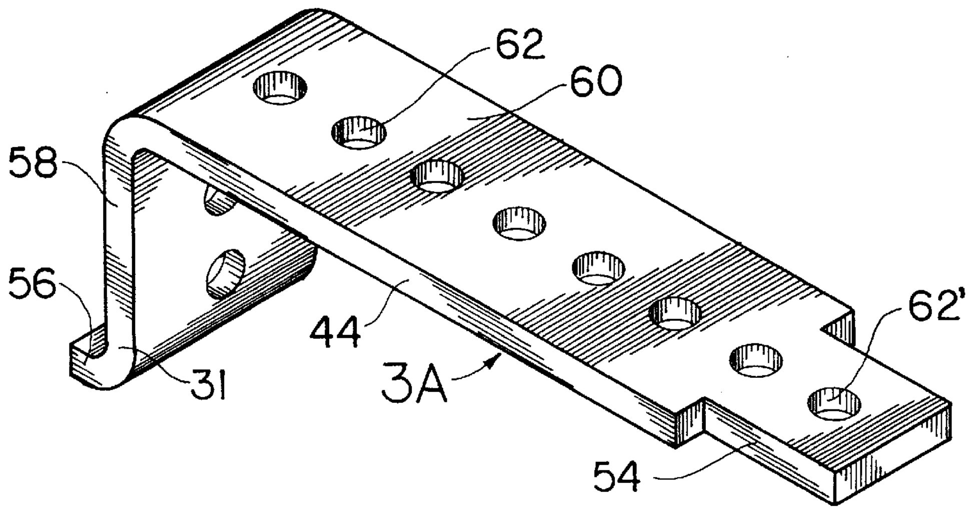
FIG. 3A is a perspective of the locking member
Figure 3B:
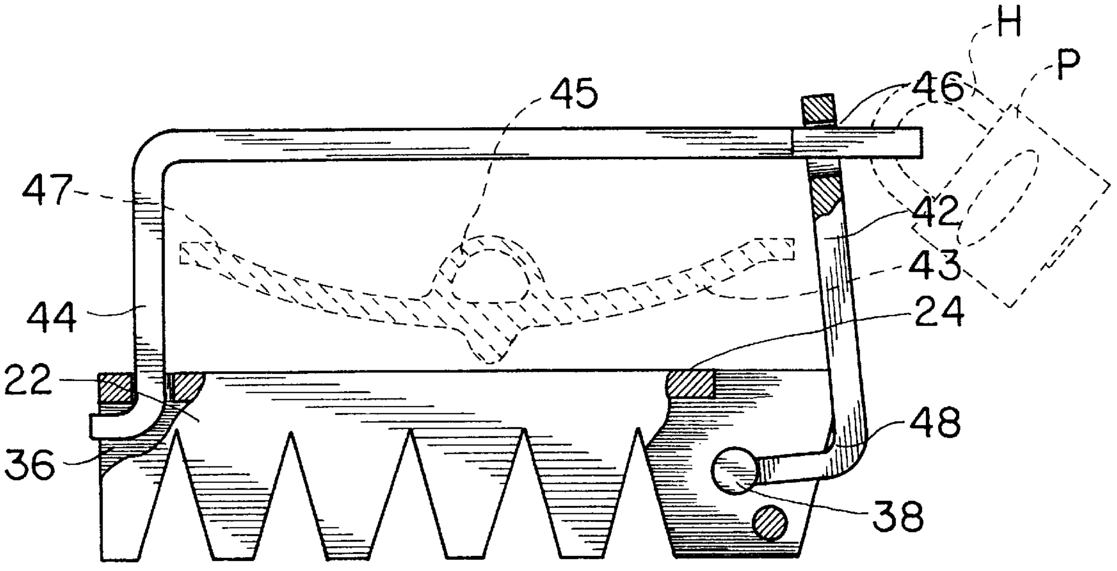
FIG. 3B is a side view of the device installed on a ski shown in dotted lines and in cross-section

One can see on FIG. 3A that locking member 3A, preferably of Z-shaped section comprises a central part 58 combining a short fold 56 at one end and a long fold 60 at the other end terminated by protruding 54; the central part 58 and the long fold 60 have holes 62 and protruding end 54 has an eyelet 62', laid cut lengthwise along a centre line. The short fold 56 enters the aperture 40—FIG. 2A—and underlies web 24—FIG. 3B—. Long fold overlies the top 45 of the ski 47, its protruding end 54 going through locking aperture 52 of pivotal member 2B and locked by the hook of a padlock P inserted through eyelet 62'.

DIRECTIONS FOR USE

The directions comprise the following steps:

- insert long fold 6D of locking member 3A into the transversal apertures 51,66 of the apertured ski 47—FIG. 1—;

- lift the ski 47, place ground engaging member 2A between the ski 47 and the ground and insert the short fold 56 into the rectangular aperture 40—FIG. 2A—;

- pivot the pivot member 2B to insert the protruding end 54 of the locking member 3A into the locking aperture 52;

- insert the hook H in a padlock P or other suitable means of locking through eyelet 62' of protruding end 54 and close hook H. Other embodiments are possible and limited only by the scope of the appended claims:

I claim:

1. A locking device for the apertured ski of a snowmobile comprising a ground engaging elongated member of inverted U-shaped cross-section including a top web and two depending wings, each with a serrated lower edge forming a ground gripping means, said web having an aperture at one end of said ground engaging member and recessed relative to said wings to form an opening at the other end of said ground engaging member, an elongated locking member releasably attached to said web through said aperture and extending over and longitudinally of said ground engaging member, and an elongated pivotal member pivoted to said wings about a pivotal axis transverse to and located at said other end of said ground engaging member, said pivotal member upwardly extending through said opening, both said locking member and said pivotal member having interengageable free ends to be locked together, said ground engaging member adapted to be positioned under and transversaly of a snowmobile apertured ski with said locking member extending over said ski and through its aperture.

2. A locking device as defined in claim 1 where said pivotal member has an L-shape defining a short part and a long part, and further includes a pivot pin secured to said short part, laterally protruding from said pivotal member sand inserted into pivot holes made in said wings, said pivotal member further having a locking aperture at the free end of said long part, the length of said short part being such that said long part rests flat onto said web when said pivotal member is free from interengagement with said locking member and is pivoted to an inoperative position.

3. A locking device as defined in claim 2 wherein said elongated locking member has a Z shape defining a central part, a short fold at a first end and a long fold at a second end of said central part, said central part inserted through said aperture of said web with said short fold underlying said web, said long fold having a protruding and releasably inserted through said locking aperture of said pivotal member and provided with an eyelet to receive the hook of a padlock to prevent said protruding end from sliding out of said locking aperture.

4. A locking device as defined in claim 3 wherein said protruding end is flat and said locking aperture is rectangular to slidably receive said protruding end.

5. A locking device as defined in claim 2 further including stop means carried by said wings under said pivot holes for limiting pivotal movement of said pivot member.

6. A locking device as defined in claim 5 wherein said top means includes a stop rod secured to said wings and extending across said ground engaging member, parallel to said pivot pin.

7. A locking device as defined in claim 2 wherein said pivot member and said locking member have weight reducing holes.

* * * * *